(12) United States Patent
Kahn et al.

(10) Patent No.: US 9,130,829 B2
(45) Date of Patent: Sep. 8, 2015

(54) METHODS AND SYSTEMS FOR OBTAINING LOAD INFORMATION IN NETWORKS

(71) Applicant: Alcatel-Lucent USA Inc., Murray Hill, NJ (US)

(72) Inventors: Colin Kahn, Morris Plains, NJ (US); Michel Chevanne, Clamart (FR); Laurent Roullet, Barcelonne (FR)

(73) Assignee: Alcatel Lucent, Boulogne-Billancourt (FR)

( * ) Notice: Subject to any disclaimer, the term of this patent is extended or adjusted under 35 U.S.C. 154(b) by 110 days.

(21) Appl. No.: 13/656,149

(22) Filed: Oct. 19, 2012

(65) Prior Publication Data

US 2014/0112138 A1    Apr. 24, 2014

(51) Int. Cl.
*H04W 28/08* (2009.01)
*H04L 12/26* (2006.01)
*H04W 28/02* (2009.01)

(52) U.S. Cl.
CPC .......... *H04L 43/062* (2013.01); *H04L 43/0876* (2013.01); *H04W 28/0289* (2013.01)

(58) Field of Classification Search
CPC ....... H04L 47/10; H04L 47/125; H04L 28/08; H04L 28/10; H04L 28/20
USPC ............................ 370/235, 328; 455/436, 453
See application file for complete search history.

(56) References Cited

U.S. PATENT DOCUMENTS

| | | | |
|---|---|---|---|
| 8,498,653 B2 * | 7/2013 | Gao et al. ...................... | 455/453 |
| 2007/0218913 A1 | 9/2007 | Chen | |
| 2011/0053598 A1 * | 3/2011 | Ahluwalia ..................... | 455/436 |
| 2012/0155308 A1 * | 6/2012 | Lee et al. ...................... | 370/252 |
| 2012/0213123 A1 * | 8/2012 | Futaki ............................ | 370/254 |
| 2013/0072212 A1 * | 3/2013 | Nakamura et al. .......... | 455/452.1 |
| 2013/0163424 A1 * | 6/2013 | Goerke et al. ................ | 370/235 |
| 2013/0182638 A1 * | 7/2013 | Zhou et al. ..................... | 370/315 |
| 2013/0212630 A1 * | 8/2013 | Venkatraman et al. ......... | 725/62 |

FOREIGN PATENT DOCUMENTS

| | | |
|---|---|---|
| EP | 2416605 A1 | 2/2012 |
| WO | WO-2009099224 A1 | 8/2009 |

OTHER PUBLICATIONS

International Search Report and Written Opinion dated Apr. 17, 2014.

* cited by examiner

*Primary Examiner* — Rasheed Gidado

(74) *Attorney, Agent, or Firm* — Harness, Dickey & Pierce, P.L.C.

(57) ABSTRACT

At least one example embodiment discloses a system including a plurality of base stations. The system further includes a proxy server configured to generate a request for loading information from at least one of the plurality of base stations and receive the loading information from the at least one of the plurality of base stations, the request being a base station to base station interface message.

16 Claims, 3 Drawing Sheets

METHODS AND SYSTEMS FOR OBTAINING LOAD INFORMATION IN NETWORKS

BACKGROUND

In mobile systems, end-user applications typically adjust to network congestion by sensing an end-to-end bandwidth between a user equipment (UE) and application server and adapting service accordingly.

An example is HTTP adaptive streaming (HAS) used in Apple™ Live Streaming, Microsoft™ Smooth Streaming/Silverlight, Adobe™ Dynamic Streaming for Flash™ and 3GPP DASH for streaming multimedia content. With HAS, the UE requests approximately 2 second content chunks, where the size of each chunk depends primarily on a time to receive a prior chunk.

In contrast, network optimization and yield management functions rely on proprietary interfaces to network elements, network probes that monitor standardized bearer path and control interfaces, or interfaces to operations, administration and maintenance (OA&M) systems to obtain network element and air-interface congestion states. Optimization and yield management functions that delay content download until the network is not busy, transcode/transrate content so it consumes less network resources or perform other similar functions are typically triggered based on the obtained congestion state.

SUMMARY

Example embodiments disclose methods and systems for obtaining load information. In end-user applications such as HAS and network optimization & yield management functions, example embodiments provide load information of network elements. Example embodiments do not require external probes that monitor traffic, do not use proprietary interfaces to the network element, which are ill-suited for multi-vendor networks, and do not impact the network element, requiring "feature" development when new monitoring information is needed. Once the loading information is determined, the loading information may be processed and used by end-user applications, yield management and network optimization functions among other functions.

An example embodiment discloses a system including a plurality of base stations. The system further includes a proxy server configured to generate a request for loading information from at least one of the plurality of base stations and receive the loading information from the at least one of the plurality of base stations, the request being a base station to base station interface message.

In an example embodiment, the proxy server is configured to invoke a Resource Status Initiation procedure defined in 3GPP TS 36.423 to generate the request for loading information.

In an example embodiment, the proxy server is configured to generate a Resource Status Request Message as the request.

In an example embodiment, the Resource Status Request message indicates a rate for the at least one of the plurality of base stations to transmit the loading information.

In an example embodiment, the proxy server is configured to communicate with the plurality of base stations over 3GPP X2 interfaces.

In an example embodiment, the proxy server is configured to transmit the loading information to at least one of Yield Management, Network Optimization and Application Optimization application functions.

In an example embodiment, the proxy server is configured to receive Resource Status Request Messages from the plurality of base stations, respectively, and transmit a response to each received status request message, the response indicating zero resources.

In an example embodiment, the proxy server is configured to generate the request periodically.

In an example embodiment, the proxy server is configured to receive the loading information in a Resource Status Update message.

In an example embodiment, the Resource Status Update message includes at least one of a hardware load indicator, an S1 transport network load indicator, a radio resource status, a composite available capability group and Almost Blank Subframe (ABS) information.

In an example embodiment, the base station to base station interface message is a standardized 3GPP X2 interface message.

An example embodiment discloses a method of obtaining loading information from at least one of a plurality of base stations in a system. The method includes generating, by a proxy server, a Resource Status Request message for the loading information from at least one of the plurality of base stations, the Resource Status Request message being a base station to base station interface message and receiving, by the proxy server, a Resource Status Update message, the Resource Status Update message including the loading information from the at least one of the plurality of base stations, the Resource Status Update message being a base station to base station interface message.

In an example embodiment, the Resource Status Request message indicates a rate for the at least one of the plurality of base stations to transmit the loading information.

In an example embodiment, the receiving receives the Resource Status Update message over a 3GPP X2 interface.

In an example embodiment, the method further includes transmitting the loading information to at least one of Yield Management, Network Optimization and Application Optimization application function servers.

In an example embodiment, the transmitting includes transmitting the loading information to at least one of Yield Management, Network Optimization and Application Optimization application function servers when a load indicated in the loading information exceeds a threshold.

In an example embodiment, the Resource Status Request message and the Resource Status Update message are 3GPP standardized messages

BRIEF DESCRIPTION OF THE DRAWINGS

Example embodiments will be more clearly understood from the following detailed description taken in conjunction with the accompanying drawings.

FIG. 1 illustrates a system according to an example embodiment;

FIG. 2 illustrates a method of obtaining load information according to an example embodiment; and FIG. 3 illustrates an X2 proxy server according to an example embodiment.

DETAILED DESCRIPTION

Figure 1:
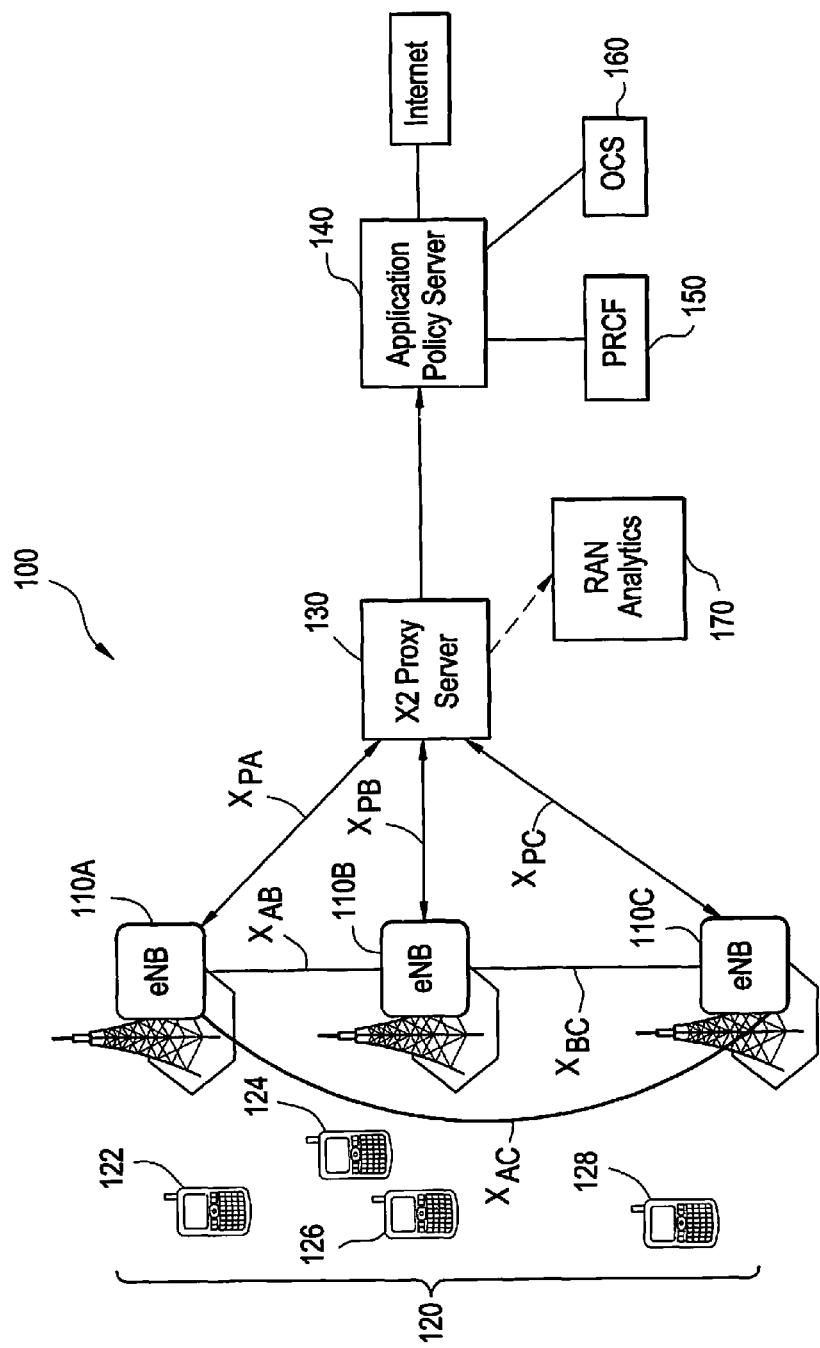
FIGS. 1-3 represent non-limiting, example embodiments as described herein.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Serving base station may refer to the base station currently handling communication needs of the UE.

Example embodiments disclose a proxy server configured to generate 3GPP standardized X2 interface messages requesting loading information from at least one of a plurality of eNBs and configured to receive the loading information from the at least one of the eNBs. The proxy server exploits a mechanism that 3GPP has defined for sharing of congestion information between eNBs to instead extract loading information from the RAN for use by applications, network optimization functions and yield management functions. The proxy server generates and sends a Resource Status Request message to obtain the loading information from the eNB and receives a Resource Status Update message from the eNB. The Resource Status Update message includes the loading information from the eNB.

FIG. 1 illustrates a system according to an example embodiment. A wireless communications system 100 may follow, for example, a Long Term Evolution (LTE) protocol. Wireless communications system 100 includes a first eNB 110A; a second eNB 110B; a third eNB 110C; a plurality of user equipments (UEs) 120 including first UE 122; second UE 124; third UE 126; and fourth UE 128; a proxy server 130; an application policy server 140; a policy and charging rules function node (PCRF) 150; an Online Charging System (OCS) 160; and radio access network (RAN) Analytics 170.

The X2 proxy server 130, application policy server 140, PCRF 150, OCS 160 and RAN Analytics 170 each may include one or more processors and an associated memory operating together to achieve their respective functionality.

It should be noted that the wireless communications system 100 is not limited to the features shown therein. These features are shown for explanation of example embodiments. It should be understood that the wireless communications system 100 may include common LTE features such as a home subscriber server (HSS), an Off-line charging System (OFCS), a serving gateway (S-GW), and a public data network (PDN) gateway (P-GW).

The UEs 120 may be in wireless communication with at least a respective one of the first eNB 110A, the second eNB 110B and the third eNB 110C. The UEs 120 may be, for example, mobile phones, smart phones, computers, or personal digital assistants (PDAs). The first eNB 110A, the second eNB 110B and the third eNB 110C communicate with each other over X2 interfaces. More specifically, the first eNB 110A and the second eNB 110B communicate over an X2 interface $X_{AB}$, the third eNB 110C and the second eNB 110B communicate over an X2 interface $X_{BC}$ and the first eNB 110A and the third eNB 110C communicate over an X2 interface $X_{AC}$.

The X2 interface is defined by 3GPP standards. Therefore, for the sake of brevity, the X2 interfaces $X_{AB}$, $X_{BC}$ and $X_{AC}$ will not be described in greater detail.

The X2 proxy server 130 communicates with the first eNB 110A, the second eNB 110B and the third eNB 110C over X2 interfaces $X_{PA}$, $X_{PB}$ and $X_{PC}$, respectively.

The X2 proxy server 130 registers as an eNB with the first eNB 110A, the second eNB 110B and the third eNB 110C in the wireless communications system 100. The X2 proxy server 130 indicates to the first eNB 110A, the second eNB 110B and the third eNB 110C that the X2 proxy server 130 has no resources to support calls, avoiding hand-off attempts by the first eNB 110A, the second eNB 110B and the third eNB 110C to the X2 proxy server 130. For example, no resources to support calls may be indicated by the X2 Proxy server 130 to eNBs 110A-110C by the sending of a Resource Status Update message in response to a Resource Status Request message where the Resource Status Update message contains one or more of a Hardware Load set to "Overload", an S1 Transport Network Load set to "Overload", a Radio Resource Status indicating usage set to 100 or the like (on a scale of zero to 100), and a Composite Available Capability Group indicating a Capacity Value of 0 (on a scale of zero to 100).

Since the X2 proxy server 130 communicates with the first eNB 110A, the second eNB 110B and the third eNB 110C over X2 interfaces, new eNBs are not required to be developed and existing eNBs need not be modified, the proxy server 130 may communicate with eNBs from multiple vendors and the proxy server 130 is complementary to existing products that use probes to gather wireless network intelligence.

The X2 proxy server 130 is configured to obtain load information from the first eNB 110A, the second eNB 110B and the third eNB 110C. The load information may include a Hardware Load, S1 Transport Network Load, Radio Resource Status and Composite Available Capability Group. Hardware Load, S1 Transport Network Load, Radio Resource Status and Composite Available Capability Group are defined in 3GPP.

The X2 proxy server 130 may process the load information and communicate the processed load information to the application policy server 140.

A method of obtaining load information according to an example embodiment is described in greater detail with reference to FIG. 2. The method of FIG. 2 may be implemented by the wireless communication system 100 and, more specifically, the X2 proxy server 130.

Figure 2:
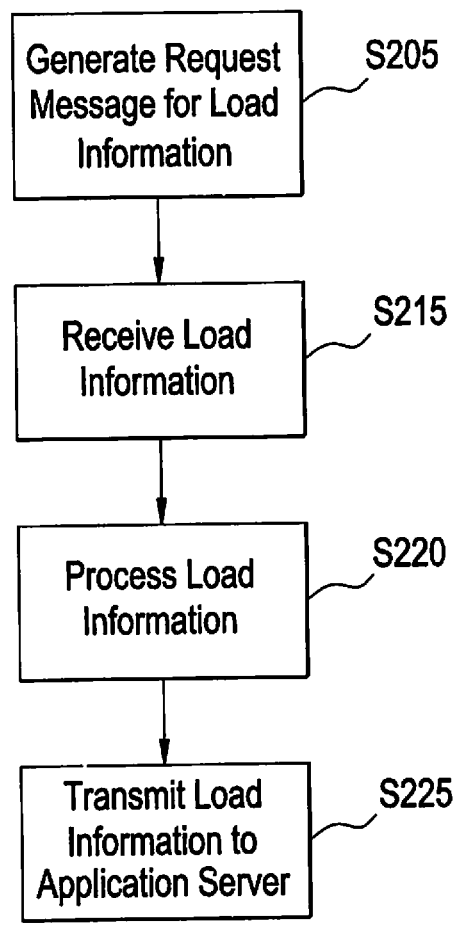

As shown in FIG. 2, the X2 proxy server 130 generates a request message for loading information at 5205 and transmits the request message over the X2 interface. More specifically, the X2 proxy server 130 invokes a 3GPP standardized "Resource Status Initiation" procedure defined in 3GPP TS 36.300 and TS 36.423 by sending a Resource Status Request message to each actual eNB the proxy server 130 wants to monitor. The Resource Status Request message is defined in 3GPP TS 36.423. The entire contents of 3GPP TS 36.300 and TS 36.423 are hereby incorporated by reference. The X2 proxy server may generate the request periodically.

In FIG. 1, the X2 proxy server 130 transmits a Resource Status Request message to at least one of the first eNB 110A, the second eNB 110B and the third eNB 110C. In the Resource Status Request message, the X2 proxy server 130 requests periodic or one time reports from the respective first eNB 110A, the second eNB 110B and the third eNB 110C.

The first eNB 110A, the second eNB 110B and the third eNB 110C respond by invoking the 3GPP Resource Status Reporting procedure and periodically sending a Resource Status Update message to the X2 proxy server 130, which the eNB thinks is a neighbor eNB. The Resource Status Update message contains the eNB loading information The Resource Status Update message is defined in 3GPP TS 36.423.

Consequently, at S215, the X2 proxy server 130 receives the requested load information from the eNBs. The Resource Status Update message for each eNB may include one or more of a Hardware Load Indicator, S1 Transport Network Load Indicator, Radio Resource Status and Composite Available Capability Group and an Almost Blank Subframe (ABS) Information.

The Hardware Load Indicator indicates separately for an uplink (UL) and a downlink (DL), the hardware load level for the eNB.

The S1 Transport Network Load Indicator indicates the status of a S1 interface (between eNB and SGW) Transport Network Load experienced by the cell (low, medium, high, overload).

The Radio Resource Status indicates separately for the UL and DL, the percent usage of the physical resource blocks (PRBs) for guaranteed bit rate (GBR) and non-GBR bearers, and total PRB usage on a 0-100 scale.

The Composite Available Capability Group indicates separately for the UL and DL, (1) the Cell Capacity Class Value, which classifies the cell traffic capacity relative to the other cells (0 to 100 scale) and (2) the Cell Capacity Value which indicates the amount of cell resources available relative to the total resources. The Cell Capacity Value may reflect other criteria such as total LTE Physical Resource Block (PRB) utilization, number of UEs per eNB, number of UEs per cell, number of data bearers per eNB and number of data bearers per cell.

The X2 proxy server 130 receives updates from the first eNB 110A, the second eNB 110B and the third eNB 110C at the rate requested in the respective Resource Status Request message. For example, the rate can be every 1, 2, 5, 10 seconds or longer.

At S220, the X2 proxy server 130 processes the load information to create more stable metrics for use by RAN state aware Yield Management, Network Optimization and Application Optimization Functions such as the application policy server 140 and the RAN Analytics 170. For example, the X2 proxy server may receive load information every few seconds from the eNBs and may average the received load information so reports to the application server are transmitted every minute.

The X2 proxy server 130 may process the load information received from the eNBs by performing filtering, correlation, thresholding and other functions tailored to the needs of applications, network optimization functions and yield management functions. These functions may reside on the X2 proxy server 130, or reside external to the X2 proxy server 130 and use application programming interfaces (APIs) on the X2 proxy server 130 to obtain the network loading information.

Therefore, at S225, the X2 proxy server 130 transmits the load information to one of RAN state aware Yield Management, Network Optimization and Application Optimization Function servers.

In an alternate example embodiment, the transmitting includes transmitting the loading information to at least one of Yield Management, Network Optimization and Application Optimization application function servers when a load indicated in the loading information exceeds a threshold. By transmitting the loading information when the load exceeds a threshold, the bandwidth consumed by the X2 proxy server 130 is reduced. The threshold may be programmed into the X2 proxy server 130 based on empirical data, for example.

The application policy server 140 executes policies associated with applications (e.g., turbo-boost, Mobile Smartload, dynamic pricing), or subscriber applications/content providers. The interface to these platforms may be via an API interface and secure exposure fabric such as Open API Platform (OAP). Examples of Network Optimization and Yield Management functions include the video optimization (compression/transrating/transcoding) triggered when cells are congested; de-prioritization of heavy users on congested cells to enforce fairness in accessing network resources; allocation of resources on congested cells according to Customer Lifetime Value as may be reflected in Loyalty Management programs, tiered service levels and/or business analytics; access network selection between 3GPP and Wi-Fi to improve Subscriber Quality of Experience (QoE) based loading information; trigger content downloads to UE based on loading information; offer discounted access to subscribers based on loading information; offer access to $3^{rd}$ party sponsoring applications at a price tied to loading information; and offer subscribers enhanced access (Turbo Boost) based on load information.

If the X2 proxy server 130 receives a Resource Status Request message from one of the first eNB 110A, the second eNB 110B and the third eNB 110C, the X2 proxy server 130 responds as instructed indicating zero resources are available for handling UE traffic.

Figure 3:
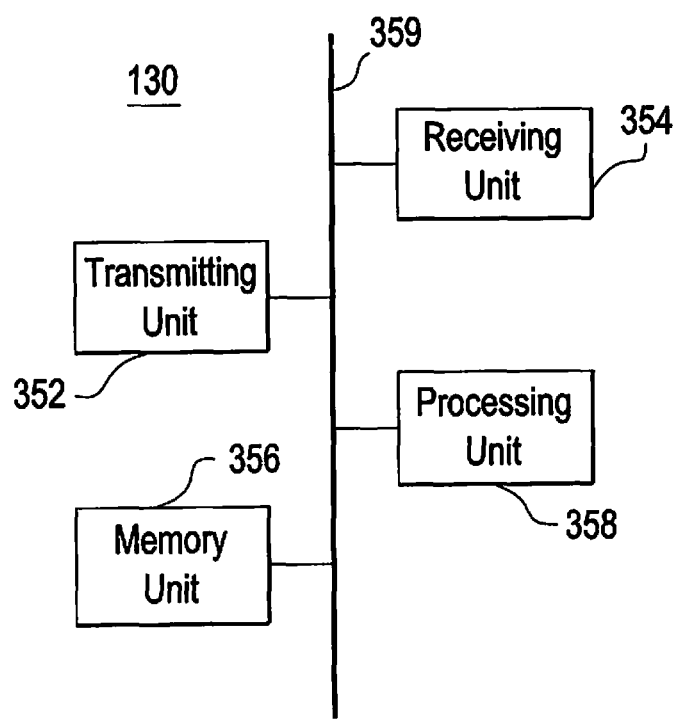

FIG. 3 illustrates the X2 proxy server 130 in more detail. Referring to FIG. 3, the X2 proxy server 130 may include, for example, a data bus 359, a transmitting unit 352, a receiving unit 354, a memory unit 356, and a processing unit 358.

The transmitting unit 352, receiving unit 354, memory unit 356, and processing unit 358 may send data to and/or receive data from one another using the data bus 359. The transmitting unit 352 is a device that includes hardware and any necessary software for transmitting wired and/or wireless signals including, for example, data signals and control signals, via one or more wired and/or wireless connections to other network elements in the wireless communications network 100.

The receiving unit 354 is a device that includes hardware and any necessary software for receiving wired and/or wireless signals including, for example, data signals and control signals, via one or more wired and/or wireless connections to other network elements in the wireless communications network 100.

The memory unit 356 may be any device capable of storing data including magnetic storage, flash storage, etc.

The processing unit 358 may be any device capable of processing data including, for example, a microprocessor configured to carry out specific operations based on input data, or capable of executing instructions included in computer readable code.

For example, the processing unit 358 is capable of generating a request message for load information and processing the received load information, as described in FIG. 2.

The memory unit 356 may store executable instructions corresponding to each of the operations described in FIG. 2.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A system including a plurality of base stations, the system comprising:
   a proxy server configured to generate a request for loading information from at least one of the plurality of base stations and receive the loading information from the at least one of the plurality of base stations, the request being a base station to base station interface message, wherein the proxy server is configured to receive Resource Status Request Messages from the plurality of base stations, respectively, and transmit a response to each received status request message, the response indicating zero resources to support calls and receive handoff attempts in at least one of a Hardware Load set to overload, an S1 Transport Network Load set to overload and a Radio Resource Status indicating a maximum usage.

2. The system of claim 1, wherein the proxy server is configured to invoke a Resource Status Initiation procedure defined in 3GPP TS 36.423 to generate the request for loading information.

3. The system of claim 2, wherein the proxy server is configured to generate a Resource Status Request Message as the request.

4. The system of claim 3, wherein the generated Resource Status Request message indicates a rate for the at least one of the plurality of base stations to transmit the loading information.

5. The system of claim 1, wherein the proxy server is configured to communicate with the plurality of base stations over 3GPP X2 interfaces.

6. The system of claim 1, wherein the proxy server is configured to transmit the loading information to at least one of Yield Management, Network Optimization and Application Optimization application servers.

7. The system of claim 1, wherein the proxy server is configured to generate the request periodically.

8. The system of claim 1, wherein the proxy server is configured to receive the loading information in a Resource Status Update message.

9. The system of claim 8, wherein the received Resource Status Update message includes at least one of a hardware load indicator, an S1 transport network load indicator, a radio resource status, a composite available capability group and Almost Blank Subframe (ABS) information.

10. The system of claim 1, wherein the base station to base station interface message is a standardized 3GPP X2 interface message.

11. A method of obtaining loading information from at least one of a plurality of base stations in a system, the method comprising:
    generating, by a proxy server, a Resource Status Request message for the loading information from at least one of the plurality of base stations, the Resource Status Request message being a base station to base station interface message;
    receiving, by the proxy server, a Resource Status Update message, the Resource Status Update message including the loading information from the at least one of the plurality of base stations, the Resource Status Update message being a base station to base station interface message;
    receiving a Resource Status Request Message from at least one of the plurality of base stations; and
    transmitting a response to each received Resource Status Request Message, the response indicating zero resources to support calls and receive handoff attempts in at least one of a Hardware Load set to overload, an S1 Transport Network Load set to overload and a Radio Resource Status indicating a maximum usage.

12. The method of claim 11, wherein the generated Resource Status Request message indicates a rate for the at least one of the plurality of base stations to transmit the loading information.

13. The method of claim 11, wherein the proxy server receives the Resource Status Update message over a 3GPP X2 interface.

14. The method of claim 11, further comprising:
    transmitting the loading information to at least one of Yield Management, Network Optimization and Application Optimization application servers.

15. The method of claim 11, wherein the received Resource Status Update message includes at least one of a hardware load indicator, an S1 transport network load indicator, a radio resource status, a composite available capability group and Almost Blank Subframe (ABS) information.

16. The method of claim 11, wherein the generated Resource Status Request message and the received Resource Status Update message are 3GPP standardized messages.

* * * * *